United States Patent
Trumbo et al.

(10) Patent No.: US 6,240,173 B1
(45) Date of Patent: May 29, 2001

(54) VIRTUAL END OFFICE IN A SWITCHED TELEPHONE NETWORK

(75) Inventors: Bruce L. Trumbo, San Diego; Sally R. Wixted, Lakeside, both of CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/168,128

(22) Filed: Oct. 7, 1998

Related U.S. Application Data

(60) Provisional application No. 60/061,307, filed on Oct. 7, 1997.

(51) Int. Cl.[7] .................................................. H04M 11/00
(52) U.S. Cl. ........................ 379/219; 379/201; 379/207; 379/229; 379/231
(58) Field of Search .............................. 379/52, 201, 207, 379/219, 220, 221, 242, 210, 211, 212, 229, 230, 231, 232, 265

(56) References Cited

U.S. PATENT DOCUMENTS

| | | |
|---|---|---|
| 4,878,240 | 10/1989 | Lin et al. . |
| 5,432,845 | 7/1995 | Burd et al. . |
| 5,550,911 | 8/1996 | Bhagat et al. . |
| 5,559,855 * | 9/1996 | Dowens et al. .......................... 379/52 |
| 5,559,856 * | 9/1996 | Dowens ................................. 379/52 |
| 5,559,857 * | 9/1996 | Dowens ................................. 379/52 |
| 5,673,299 * | 9/1997 | Fuller et al. .......................... 379/201 |
| 5,838,779 * | 11/1998 | Fuller et al. .......................... 379/211 |

* cited by examiner

*Primary Examiner*—Fan Tsang
*Assistant Examiner*—William J. Deane, Jr.
(74) *Attorney, Agent, or Firm*—Fish & Richardson PC

(57) ABSTRACT

Methods and apparatus implementing a technique for a virtual end office. The virtual end office includes one or more pre-switch adjuncts forming a single logical construct. Each pre-switch adjunct is connected to a local exchange switch in a telephone network and provides special services to subscribers. The pre-switch adjuncts have a common exchange prefix code and so a subscriber can access special services from anywhere in the network by using the same exchange prefix code, so long as the switch the subscriber is using is connected to a pre-switch adjunct.

13 Claims, 5 Drawing Sheets

VIRTUAL END OFFICE IN A SWITCHED TELEPHONE NETWORK

CROSS REFERENCE TO RELATED APPLICATIONS

This application is a conversion of U.S. Provisional Application Serial No. 60/061,307, filed Oct. 7, 1997.

TECHNICAL FIELD

This invention relates to data and voice telephony systems, and more particularly to providing services across a telephone network through a common logical source.

BACKGROUND

A switched telephone network typically includes one or more switching offices that serve subscriber loops of subscriber terminals (e.g., telephones). Such a switching office is referred to as an "end office" and contains as its major equipment component a local exchange switch (e.g., a "class 5" switch). This switch terminates the facilities that connect subscribers to the network. The local exchange switch also terminates interoffice trunk facilities ("trunks") that carry calls through the network to subscribers served by other switching offices. The main function of the switch is to establish interconnects between pairs of subscriber loops connected to the switch or between subscriber loops and trunks, depending upon whether or not both subscribers in a call are served by the same end office switch.

The invention provides methods and apparatus implementing a technique for a "virtual" end office. The virtual end office includes one or more pre-switch adjuncts forming a single logical construct. Each pre-switch adjunct is connected to a local exchange switch in a telephone network and provides special services to subscribers, such as high speed Internet access or "video on demand". The pre-switch adjuncts have a common exchange prefix code and so a subscriber can access special services from anywhere in the network by using the same exchange prefix code, so long as the switch the subscriber is using is connected to a pre-switch adjunct. This common access forms the virtual end office.

In general, in one aspect, the technique includes receiving a subscriber request for special services from a subscriber at a subscriber terminal, where the subscriber request includes an exchange prefix code indicating the virtual end office; transmitting the subscriber request to a local exchange switch connected to the subscriber terminal; transmitting the subscriber request to a pre-switch adjunct which is assigned the exchange prefix code of the virtual end office, where the pre-switch adjunct is connected to the local exchange switch and to the subscriber terminal; and providing special services to the subscriber terminal from the pre-switch adjunct.

Advantages of the technique includes one or more of the following: the special services are implemented by equipment (i.e., the pre-switch adjunct) installed such that the equipment interfaces both to the facilities that connect the subscriber to the switch (i.e., the subscriber's line) and to the switch; the pre-switch adjunct permits normal use of the subscriber's line to receive calls and when dialing numbers that do not access the special services (i.e., voice calls); logging of a call requesting special services can be implemented by the switch, for billing or other purposes; examination of the dialed number is based upon existing network capabilities, such as centrally defined toll-free numbers; recognition during the call that the subscriber's line is engaged, enabling a busy signal to be returned to callers attempting to dial the subscriber from elsewhere in the network; correct functioning of enhanced services associated with the subscriber, including but not limited to call forwarding and voice mail; the traffic on the telephone network is reduced by diverting special service calls at the pre-switch adjunct; special services which cannot be provided over the telephone network are made available through a direct connection between the subscriber terminal and the pre-switch adjunct; and all of the above can be obtained without modification to the functional implementation of the local exchange switch (notably, its stored program control software).

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 1A:
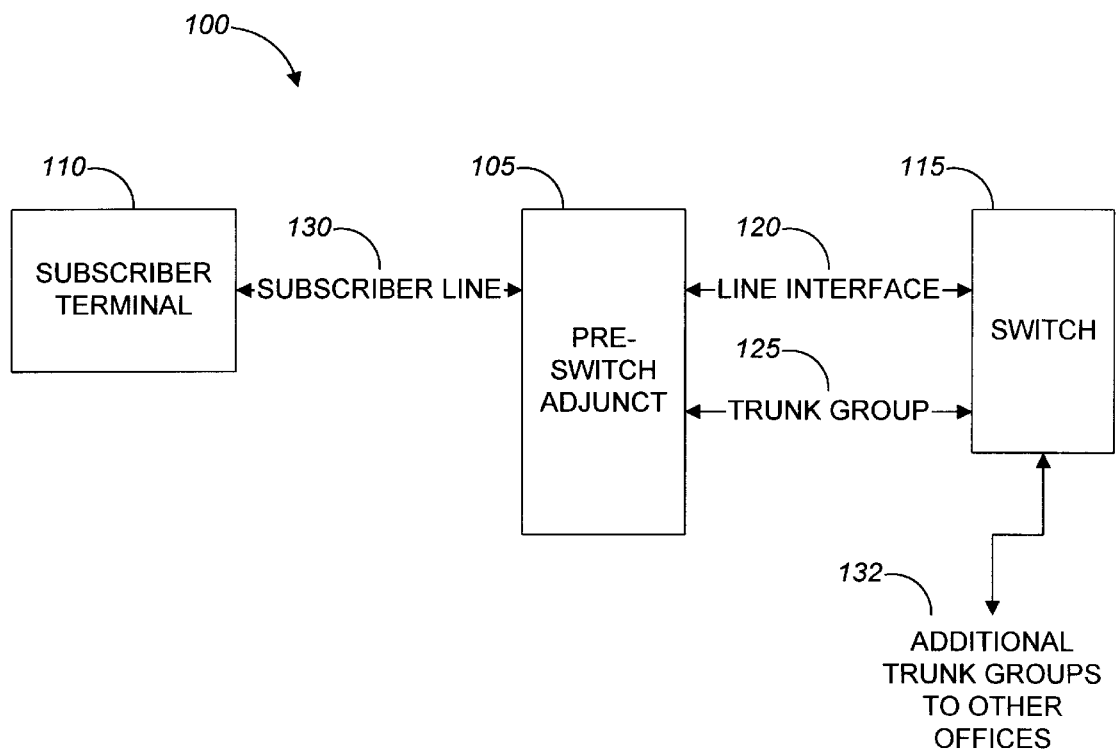
FIG. 1A shows the relationship between a switch, an adjunct in accordance with the invention, and a subscriber.

As shown in FIG. 1A, in a telephone network 100, a pre-switch adjunct 105 is interposed between a subscriber terminal 110 and a local exchange switch 115. The pre-switch adjunct 105 provides special services to a subscriber, such as "video on demand" or high speed Internet access. The local exchange switch 115 preferably is a class 5 local exchange switch, though alternatively may be another type of network switch. The pre-switch adjunct 105 is connected to the local exchange switch 115 by a line interface 120 and a trunk group 125. The pre-switch adjunct 105 is connected to the subscriber terminal by a subscriber line 130. The subscriber line 130 is preferably a conventional twisted pair line as used in the public telephone network. The pre-switch adjunct 105 may electrically terminate both the subscriber line 130 and the line interface 120 to the local exchange switch 115, or the subscriber line 130 may be electrically connected to the local exchange switch 115 and to the pre-switch adjunct 105 in parallel. In a network including multiple local exchange switches, the local exchange switch 115 is connected to other local exchange switches through additional trunk groups 132.

The subscriber line 136 carries both "signaling" (i.e., information indicating the intended recipient of the call, such as a phone number) and "payload" (i.e., information to be received by the recipient, such as voice information). The pre-switch adjunct 105 passes both signaling and payload to the switch 115 through the line interface 120. The switch 115 uses the signaling to route the call, as described below. For example, for a call requesting special services implemented by the pre-switch adjunct 105, the switch 115 establishes a connection to the pre-switch adjunct 105 through the trunk group 125, as described below. The switch 115 passes the signaling and payload along according to the route selected. The switch 115 can add additional information as appropriate for additional control within the telephone network 100.

Figure 1B:
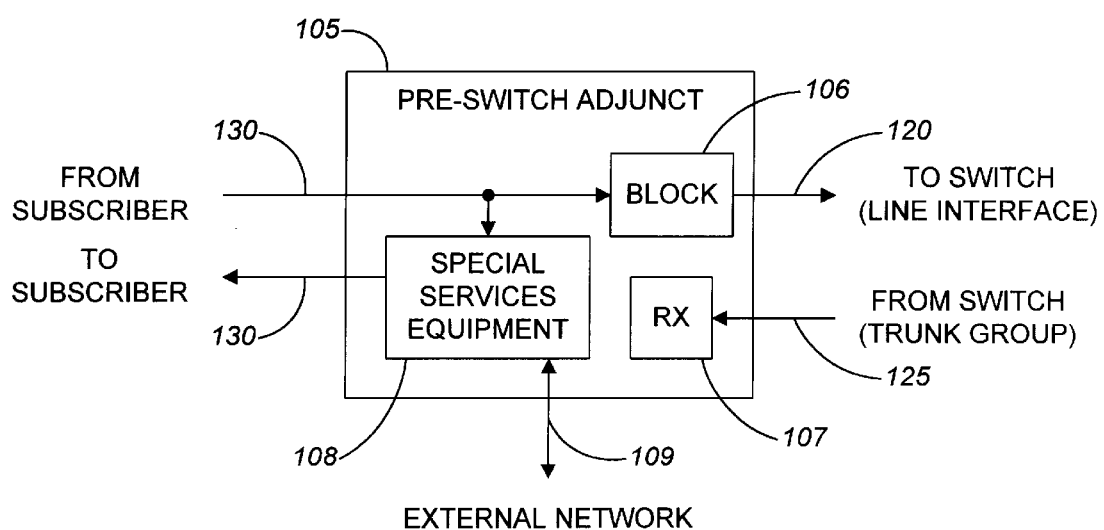
FIG. 1B is a block diagram of pre-switch adjunct in accordance with the invention.

The pre-switch adjunct 105 provides special services to a subscriber accessing the telephone network 100 through the subscriber terminal 110. The pre-switch adjunct 105 interfaces both to the facilities that connect the subscriber terminal 110 to the local exchange switch 115 (i.e., the subscriber line 130) and to the local exchange switch 115 (i.e., the line interface 120). As shown in FIG. 1B, the pre-switch adjunct 105 preferably includes a blocking component 106. The blocking component 106 establishes or breaks the connection between the subscriber line 130 and the line interface 120. The blocking component 106 allows information from the subscriber terminal 110 to pass through the pre-switch adjunct 105 to the switch 115. For special services which accept input from the subscriber terminal 110 which are not properly formatted for the switch 115, however, the blocking component 106 disconnects the subscriber line 130 from the line interface 120. In one implementation, while the pre-switch adjunct 105 is providing special services to a subscriber, the blocking component 106 replaces payload from the subscriber line 130 with "dummy" payload. The pre-switch adjunct 105 sends the dummy payload to the switch 115 so that the switch 115 perceives the call from the subscriber terminal 110 to be maintained, as described below. In an alternative implementation, the blocking component 106 checks the signaling when the subscriber terminal 110 initiates a call and intercepts calls directed to the pre-switch adjunct. In another alternative implementation, the pre-switch adjunct 105 does not include a blocking component 106.

The pre-switch adjunct 105 also includes a receiving component 107 which receives signaling and any payload supplied by the switch 115 to the pre-switch adjunct 105. The receiving component 107 uses the signaling from the switch 115 to determine which special services have been requested by which subscriber. The receiving component 107 preferably ignores payload received from the switch 115. The pre-switch adjunct 105 receives payload from the switch 115 because the switch 115 passes the payload from the line interface 120 back to the pre-switch adjunct 105 as the switch 115 is unaware that the pre-switch adjunct 105 is not another switch in the telephone network 100, as described below.

The pre-switch adjunct 105 includes special services equipment 108 which implements the available special services. The special services equipment 108 receives payload from the subscriber terminal 110 through the subscriber line 130. The special services equipment 108 also sends information to the subscriber terminal 110 through the subscriber line 130. Thus, the subscriber terminal 110 and the pre-switch adjunct 105 are directly connected. Depending upon the nature of the special services provided by the pre-switch adjunct 105, the pre-switch adjunct 105 implements the special services directly, indirectly, or some combination thereof. An example of a special service implemented directly is "video on demand" and an example of a special service implemented indirectly is high speed Internet access. For special services directly implemented by the pre-switch adjunct 105, the special services equipment 108 includes all the components necessary to completely implement the special services. For example, in one video on demand implementation, the pre-switch adjunct 105 includes equipment 108 implementing a database of available video presentations, such as movies, as well as the control components for providing the movie to the subscriber line 130. A subscriber requests a particular movie and the pre-switch adjunct 105 sends the movie to the subscriber through the subscriber line 130. Services implemented indirectly by the pre-switch adjunct 105 are implemented outside the pre-switch adjunct 105. In this case, the pre-switch adjunct 105 acts as a link to such special services. The special services equipment 108 routes the information from the subscriber terminal to an external link 109 and on to an appropriate network or hardware. The external link 109 provides a data connection between the pre-switch adjunct 105 and the implementation of the special services, such as through a cable. For example, in a high speed Internet access implementation, the pre-switch adjunct 105 includes equipment 108 and an external link 109 for connecting the subscriber to a computer network which is distinct from the public switch network (i.e., the network 100 including switch 115). A pre-switch adjunct 105 which only directly implements special services does not include an external link 109. Alternatively, the pre-switch adjunct 105 implements some special services directly and some indirectly. A particular special service can also be implemented so that some portion of the service is directly implemented by the pre-switch adjunct 105 and the remainder is implemented outside the pre-switch adjunct 105.

To receive special services, a subscriber enters a request including a special services identifier through the subscriber terminal 110, such as by dialing a number. The pre-switch adjunct 105 does not interfere with normal use of the subscriber's line to receive calls and when dialing numbers that do not access the special services (e.g., voice calls). The local exchange switch 115 preferably controls calls which activate the special services, though, as described above, the special services are implemented within the pre-switch adjunct 105 not within the switch 115. Accordingly, the pre-switch 105 adjunct operates "on top" of the public telephone network 100 and does not require any modification be made to the network 100. Additional advantages of controlling the call through the local exchange switch 115 and implementing the special service in the pre-switch adjunct 105 include:

- logging of the call can be implemented by the local exchange switch 115, for billing or other purposes;
- examination of the dialed number is based upon existing network capabilities, such as centrally defined toll-free numbers;
- during the call the local exchange switch 115 can recognize that the subscriber's line is engaged, enabling a busy signal to be returned to callers attempting to dial the subscriber from elsewhere in the telephone network 100;
- enhanced services associated with the subscriber or subscriber terminal 110 can function correctly, including but not limited to call forwarding and voice mail;
- the subscriber is connected directly to the pre-switch adjunct 105 so the special services need not pass through the local exchange switch 115;
- the traffic on the telephone network 100 is reduced by diverting special service calls at the pre-switch adjunct 105;
- special services which cannot be provided over the telephone network 100 due to the configuration and operation of local exchange switches 115 are made available through the direct connection between the subscriber terminal 110 and the pre-switch adjunct;

these advantages can be implemented without substantial modification to the functional implementation of the local exchange switch 115, notably, the switch's 115 stored program control software.

Figure 2:
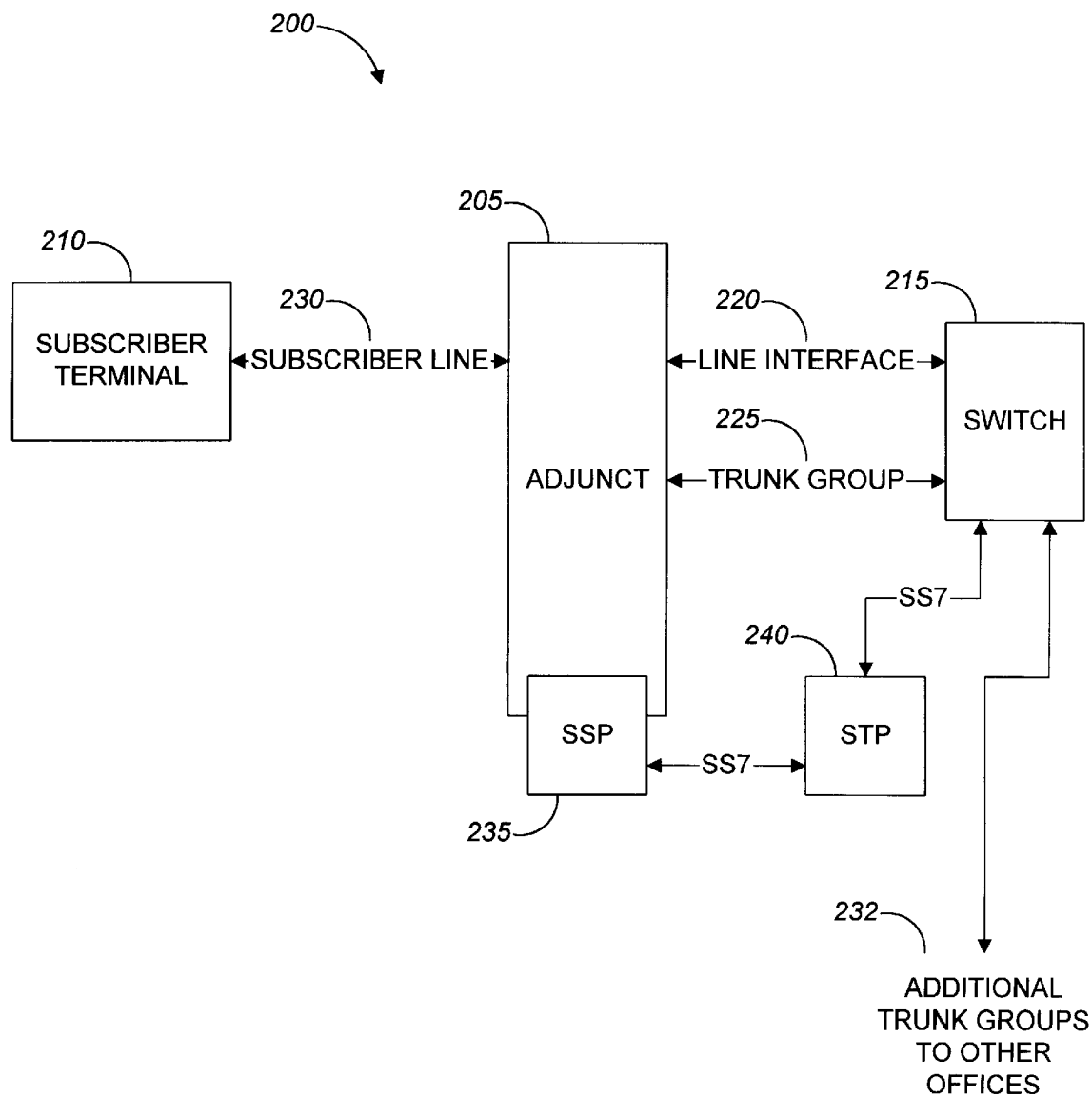
FIG. 2 is a block diagram of a basic form of a virtual end office in accordance with the invention.

As shown in FIG. 2, in a telephone network 200 using common channel signaling, such as Signaling System 7 ("SS7"), signaling follows an alternative path through additional equipment. In the case of SS7 specifically, the signaling path terminates at a service switching point 235 ("SSP", the SS7 function that handles call control) associated with the pre-switch adjunct 205. The SSP 235 is connected to an SS7 signal transfer point 240 ("STP"), which is in turn connected to a local exchange switch 215. The payload follows the same path as in FIG. 1, through the trunk groups and line interfaces.

Basic call routing in the telephone network is performed in a hierarchical manner. Each subscriber line has an associated directory number. To dial a subscriber within the same geographical area as the caller, the caller generally enters the directory number of the intended subscriber. To dial a subscriber in a different geographical area, additional digits are typically dialed before the directory number; the additional digits identify the geographical area in which the intended subscriber is located through an area code.

The geographical area within which dialing can be done without the use of additional digits generally encompasses a much larger number of subscriber lines than can be terminated at one switching office. The set of directory numbers within a geographical area are therefore divided among a number of end offices, each equipped with a class 5 local exchange switch.

Figure 3:
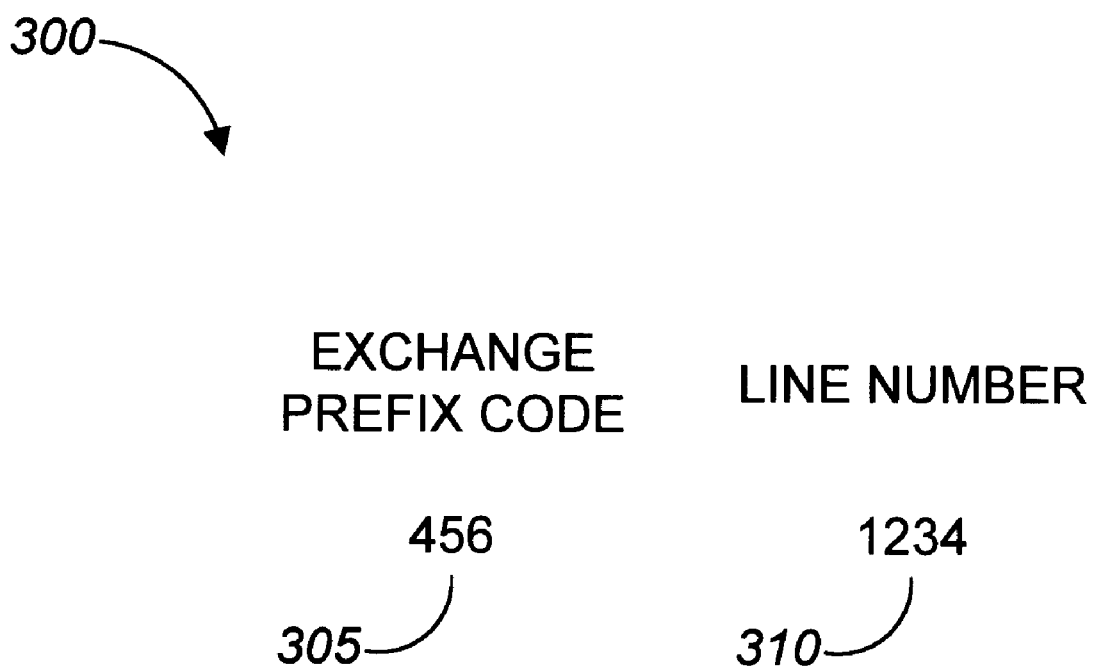
FIG. 3 is a diagram of directory number structure.

As shown in FIG. 3, the division of directory numbers among switching offices is based upon the leading part of the directory number 300. This leading part of the directory number 300 is the exchange prefix code 305. The trailing part of the directory number is a line number 310 used to identify the specific subscriber line at a switching office. Several exchange prefix codes may be assigned to a single local exchange switch.

This system of directory number allocation allows a switch to route calls it originates according to simple algorithms. The local exchange switch examines the dialed directory number 300 and determines a routing. For calls within the local geographical area, the exchange prefix code 305 is examined first. If the exchange prefix code 305 matches one of the exchange prefix codes assigned to the local exchange switch, the call is handled completely within the local exchange switch; no trunks are used. In this case, the line number 310 of the directory number 300 is used to select the intended subscriber line and to complete the call. The local exchange switch rings the dialed subscriber line and establishes the interconnect internally.

For calls to directory numbers 300 which are not on the same local exchange switch, the local exchange switch uses the exchange prefix code 305 to determine routing. Many of the trunk groups terminating at the switch connect to other end offices ("peer switches"). Each of these trunk groups is associated with the exchange prefix code 305 assigned to the peer switch terminating the remote end of the trunk. The call is routed on a trunk group corresponding to a peer end office assigned to the exchange prefix code 305 of the dialed directory number 300. The local exchange switch selects an appropriate trunk and forwards the call signaling information, including the dialed directory number 300, to the peer local exchange switch at the other end of the trunk. For trunks employing common channel signaling, such as SS7, the signaling is transmitted on a separate signaling facility. For trunks employing in-band, or trunk associated, signaling information is encoded and transmitted on the trunk facility itself, such as through multi-frequency tone signaling.

For calls which begin with an area code indicating a non-routable directory number, such as an "800" number, there is no mapping from the structure of the directory number onto the geography of the telephone network. The pieces of the 800 number do not correspond to an exchange prefix code 305 and a line number 310. The local exchange switch forwards the dialed number through the SS7 signaling facilities to a central database called a service control point ("SCP"). The SCP finds the 800 number in the SCP's database and finds a corresponding routable directory number. The routable directory number is an ordinary directory number 300 with an area code, exchange prefix code 305, and line number 310. The routable number is returned via the SS7 facilities to the originating local exchange switch. This routable number can be local to the switch, can be on another switch in the same area code, or can be a long distance number with a different area code. The originating local exchange switch routes the call as if the customer had dialed the routable number directly, although the billing shows that an non-routable number was dialed (e.g., an 800 number is toll-free). The translated routable number can be a directory number assigned to the pre-switch adjunct to access special services, as described below.

Once the call is accepted by the peer switch, an interconnect channel is established. Subscriber traffic, either voice information or other data, is carried between the line and the trunk via the interconnect channel.

The local exchange switch functionality described above is the same for those subscriber lines attached to a pre-switch adjunct and for those with no pre-switch adjunct attachment. Thus, the local exchange switch operates in the same way whether connected to a pre-switch adjunct or not and may be unaware of the existence of the virtual end office in the network entirely.

To provide subscriber access to the special services implemented by a pre-switch adjunct, some directory numbers are assigned to the special services. The subscriber activates a special service by dialing one of these numbers from a subscriber terminal (e.g., a telephone) on a subscriber line to which the adjunct is attached. For some special services, the pre-switch adjunct may initiate a call to a subscriber terminal as well. Dialing a number which is not assigned to the special services gives the same result to the subscriber as that given to a subscriber whose line is not connected to the adjunct, i.e., dialing an ordinary number is handled in the normal manner. To implement the virtual end office, common exchange prefix codes 305 are assigned to the pre-switch adjuncts throughout the network. Thus, the special services can be accessed directly from any subscriber terminal connected to a pre-switch adjunct using the same directory number 300.

Figure 4:
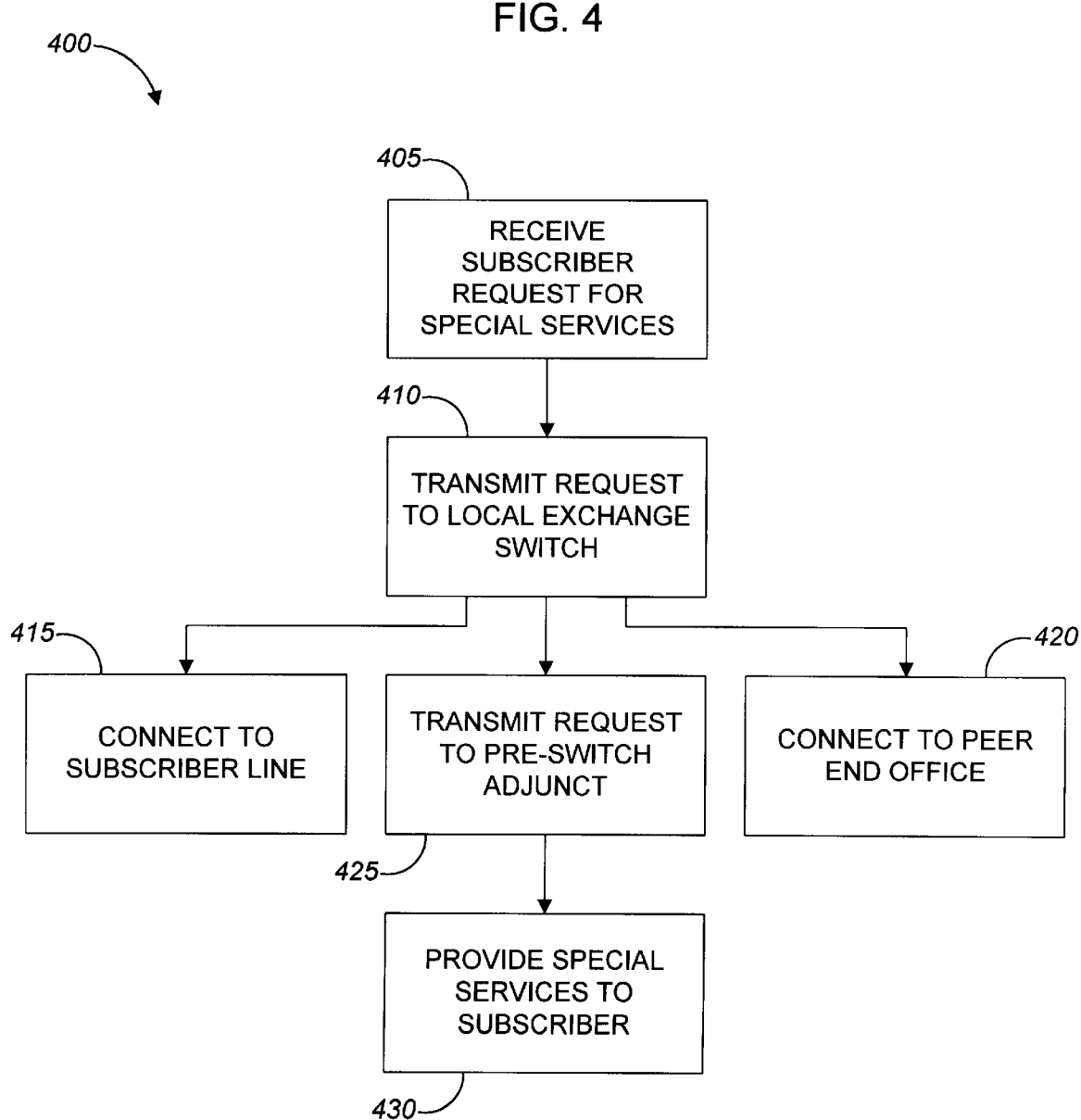
FIG. 4 is a flow chart of providing special services according to the invention.

As shown in FIG. 4, in a process 400 of establishing a connection in a telephone network including a virtual end office, a subscriber requests a voice call, i.e., a call to a number not assigned to special services, in the conventional manner of dialing a directory number (step 405). The directory number passes directly to the local exchange switch without modification by the pre-switch adjunct (step 410). The local exchange switch examines the dialed number and, in this case, determines that the call should be routed to another subscriber line on this local exchange switch (step 415) or onto a trunk to another switching office (step 420). A voice call generates no activity on trunks terminated on the pre-switch adjunct, and the special service function of the pre-switch adjunct is not activated.

Voice calls may also be directed to the subscriber in the conventional manner. The caller dials the directory number of the subscriber line. The local exchange switch connected to the called subscriber rings the subscriber line and establishes the connection. The pre-switch adjunct and the special services are not activated.

A subscriber requests a special services call, i.e., a call to a number assigned to special services, in the same way as with a voice call, by dialing a directory number (step 405). The local exchange switch receives the number without modification by the pre-switch adjunct (step 410). The local exchange switch examines the dialed number and, in this case, recognizes that the call should be routed to a trunk terminated on the pre-switch adjunct. In routing the call via the selected trunk, the local exchange switch transmits call setup signaling to the pre-switch adjunct, either on the trunk itself or via a common channel signaling path (step 425). Upon being signaled that a call is being set up, the pre-switch adjunct recognizes that a subscriber is accessing special services, and the appropriate special service or services is activated (step 430). The pre-switch adjunct may also use information delivered with the call setup signaling, including automatic number identification (ANI), dialed number indication (DNI), and any special services parameters. In particular, the adjunct may use the ANI information to identify which subscriber line is accessing its special service. The pre-switch adjunct preferably establishes a direct connection between the pre-switch adjunct and the subscriber terminal through the subscriber line. Thus, the pre-switch adjunct bypasses the local exchange switch to provide special services to the subscriber. The local exchange switch maintains the connection to indicate the subscriber line is in use, as described above. When the subscriber terminates the special services, the pre-switch adjunct releases the connection to the subscriber terminal from the pre-switch adjunct and the local exchange switch releases the connection between the subscriber terminal and the local exchange switch.

In one implementation, the special service of the pre-switch adjunct may cause the pre-switch adjunct to call the subscriber. To originate a call to the subscriber, the pre-switch adjunct uses its associated trunk group as if the pre-switch adjunct were a peer switch. The pre-switch adjunct transmits call setup signaling to the switch, either in band on the trunk itself or on a common channel signaling facility. The call setup signaling specifies the directory number of the subscriber line as the dialed number. The local exchange switch matches the dialed number to the directory number of the subscriber to identify the correct subscriber line, and rings the line. When the subscriber answers the ring, the local exchange switch completes the interconnect The adjunct activates the special services when completion of the call setup is signaled along the trunk signaling path.

The virtual end office includes the idea of allocating an exchange prefix code for the special services of pre-switch adjunct equipment, as noted above. The existing routing capabilities of the local exchange switches, such as those described above, are utilized to activate the special services of the adjunct.

At the local exchange switch, the trunk group connected to the pre-switch adjunct is treated as a peer end office trunk group assigned the exchange prefix code assigned to adjunct services. This same labeling is used at all end offices in which pre-switch adjuncts are installed. Therefore, adjunct services calls are accessed using the same directory numbers from any switch capable of the service, i.e., at which an adjunct is installed, within the local geographical area.

In the case of common channel signaling, the virtual end office is represented by a termination of the signaling channel. To maintain the appearance of a single virtual end office to which all special services calls are routed, a single signaling code is used to access the special services throughout the network. The SS7 network routes that code through an adjunct signaling network to the pre-switch adjunct connected to the local exchange switch from which the request originated. The pre-switch adjuncts are "linked" together through the same code to form the virtual end office.

Figure 5:
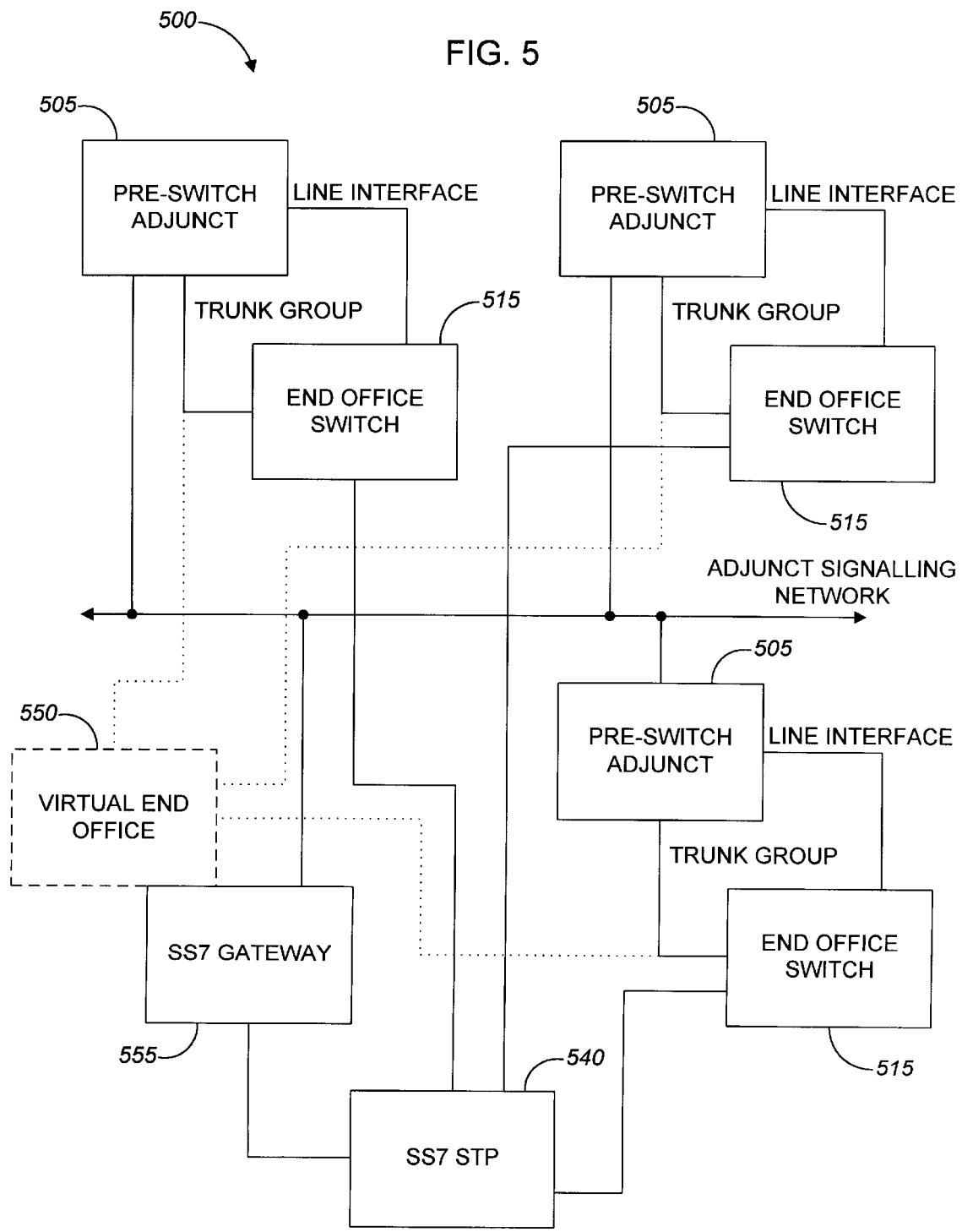
FIG. 5 illustrates a virtual end office configuration using the SS7 standard for common channel signaling.

FIG. 5 illustrates an example of a network 500 including a virtual end office 550 using SS7 for common channel signaling. SS7 signaling paths terminate at end office switches 515 in the SSP function. Conventionally, this SSP function typically is incorporated directly into the local exchange switch equipment. The virtual end office 550 terminates its SS7 signaling path in a SS7 gateway 555 that emulates the SSP function.

As special services calls are processed by the end office switches 515, the end office switches 515 send call setup information to what appears to the end office switches 515 to be another end office switch, but is actually the SS7 gateway 555. The SS7 gateway 555 relays call setup signaling information back to the pre-switch adjunct 505 at the originating end office switch 515. The pre-switch adjunct 505 then activates the special service. Payload of the calls, such as voice information or dummy payload information, is transmitted across the trunk groups. The common representation of pre-switch adjuncts with a single exchange prefix code is indicated in FIG. 5 by the dashed virtual end office 550 and dashed lines connecting the virtual end office 550 to the trunk groups.

One example application of the virtual end office invention is to provide high speed modem access to digital data services, such as the Internet. In this application, the pre-switch adjunct includes a modem platform. The modems are not constrained by the speed limitations imposed by the local exchange switch because the pre-switch adjunct connects directly to the subscriber line.

A subscriber accesses the Internet by dialing a directory number assigned to a high speed digital data service. The local exchange switch passes the call setup information to the pre-switch adjunct on the trunk group connecting the pre-switch adjunct to the local exchange switch. Upon receipt of the call setup signaling by the pre-switch adjunct, the pre-switch adjunct activates the high speed modem, and a connection is established between the subscriber terminal and the pre-switch adjunct. Thus, the subscriber's data is passed directly from the Internet through the pre-switch adjunct to the subscriber line. Although a call remains established through the local exchange switch for the duration of the subscriber's Internet access, no modem data is actually transmitted through the local exchange switch connection or the trunk circuit.

The local exchange switch logs a record of the call just as with any other call. The directory number of the call identifies it as a special services call, in this case, an Internet access call. During the Internet access call, the subscriber's line appears engaged due to the call connection maintained through the local exchange switch. Calls attempted to the subscriber are handled appropriately, with a busy signal or perhaps a voice mail service.

A number of embodiments of the present invention have been described. Nevertheless, it will be understood that various modifications may be made without departing from the spirit and scope of the invention. For example, the pre-switch adjunct can be implemented as separate adjuncts for each subscriber line or a single adjunct positioned immediately before the switch. The invention is limited only by the scope of the following claims.

What is claimed is:

1. A method of providing special services in a telephone network through a virtual end office, comprising:

receiving a subscriber request for special services from a subscriber at a subscriber terminal, where the subscriber request includes an exchange prefix code indicating the virtual end office;

transmitting the subscriber request to a local exchange switch connected to the subscriber terminal;

transmitting the subscriber request to a pre-switch adjunct which is assigned the exchange prefix code of the virtual end office, where the pre-switch adjunct is connected to the local exchange switch and to the subscriber terminal; and providing special services to the subscriber terminal directly from the pre-switch adjunct.

2. The method of claim 1, where the special services are implemented completely within the pre-switch adjunct.

3. The method of claim 1, where the pre-switch adjunct is connected to a second network for providing special services to the subscriber.

4. The method of claim 1, where the special services are provided directly to the subscriber terminal from the pre-switch adjunct and not through the local exchange switch.

5. The method of claim 1, where the telephone network includes a plurality of local exchange switches, each having one corresponding pre-switch adjunct, and where each of the plurality of pre-switch adjuncts is assigned the exchange prefix code indicating the virtual end office and so collectively logically function as the virtual end office.

6. A method of providing special services in a telephone network through a virtual end office, comprising:

receiving a subscriber request for special services from a subscriber at a subscriber terminal, where the subscriber request includes a code indicating the virtual end office;

transmitting the subscriber request to a local exchange switch connected to the subscriber terminal;

transmitting the subscriber request to a pre-switch adjunct which is assigned the code of the virtual end office, where the pre-switch adjunct is connected to the local exchange switch and to the subscriber terminal; and providing special services to the subscriber terminal directly from the pre-switch adjunct.

7. The method of claim 6, where the code is translated to a translated code which directly indicates the pre-switch adjunct.

8. A method of providing special services in a telephone network through a virtual end office, comprising:

connecting a subscriber terminal to a local exchange switch, where a user accesses the telephone network through the subscriber terminal;

connecting a pre-switch adjunct directly to the subscriber terminal, where the pre-switch adjunct provides special services to the subscriber;

connecting the pre-switch adjunct to the local exchange switch with an adjunct trunk group; and assigning an adjunct exchange prefix code to the adjunct trunk group, such that the adjunct exchange prefix code indicates the pre-switch adjunct, and the adjunct exchange prefix code is the same for each pre-switch adjunct in the telephone network, forming a virtual end office.

9. A telephone network comprising:

a subscriber terminal for subscriber access which provides a subscriber request which includes an exchange prefix code indicating a virtual end office;

a local exchange switch connected to the subscriber terminal; and a pre-switch adjunct for providing special services, connected directly to the subscriber terminal and to the local exchange switch, where the pre-switch adjunct is connected to the local exchange switch by an adjunct trunk group and is assigned an adjunct local exchange prefix such that the adjunct exchange prefix code is the same for each pre-switch adjunct in the telephone network, forming the virtual end office.

10. The telephone network of claim 9, where the local exchange switch is directly connected to the subscriber terminal.

11. The telephone network of claim 9, where the telephone network includes a plurality of local exchange switches, each having one corresponding pre-switch adjunct, and where each of the plurality of pre-switch adjuncts is indicated by the same exchange prefix code and so collectively logically function as the virtual end office.

12. The telephone network of claim 9, where the pre-switch adjunct initiates a call to a subscriber terminal to provide a special service.

13. A telephone network for providing special services through a virtual end office, comprising:

means for receiving a subscriber request for special services from a subscriber using a subscriber terminal, where the subscriber request includes an exchange prefix code indicating the virtual end office;

means for transmitting the subscriber request to a local exchange switch which is connected to the subscriber terminal;

means for transmitting the subscriber request to a pre-switch adjunct which is assigned the exchange prefix code of the virtual end office, where the pre-switch adjunct is connected to the local exchange switch and to the subscriber terminal; and means for directly providing special services to the subscriber terminal from the pre-switch adjunct.

* * * * *